United States Patent
DeHaan (10) Patent No.: US 10,203,946 B2
(45) Date of Patent: *Feb. 12, 2019

(54) RETIRING TARGET MACHINES BY A PROVISIONING SERVER

(71) Applicant: Red Hat, Inc., Raleigh, NC (US)

(72) Inventor: Michael Paul DeHaan, Morrisville, NC (US)

(73) Assignee: Red Hat, Inc., Realeigh, NC (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/853,837

(22) Filed: Sep. 14, 2015

(65) Prior Publication Data

US 2016/0004524 A1    Jan. 7, 2016

Related U.S. Application Data

(63) Continuation of application No. 12/475,427, filed on May 29, 2009, now Pat. No. 9,134,987.

(51) Int. Cl.
| | |
|---|---|
| *G06F 8/61* | (2018.01) |
| *G06F 8/60* | (2018.01) |
| *G06F 21/53* | (2013.01) |
| *G06F 21/60* | (2013.01) |
| *H04L 12/24* | (2006.01) |

(52) U.S. Cl.
CPC ............... *G06F 8/62* (2013.01); *G06F 8/60* (2013.01); *G06F 21/53* (2013.01); *G06F 21/60* (2013.01); *H04L 41/0806* (2013.01)

(58) Field of Classification Search
CPC . G06F 21/53; G06F 21/60; G06F 8/60; G06F 8/62; H04L 41/0806
See application file for complete search history.

(56) References Cited

U.S. PATENT DOCUMENTS

| | | |
|---|---|---|
| 5,742,818 A | 4/1998 | Shoroff et al. |
| 5,787,246 A | 7/1998 | Lichtman et al. |
| 5,835,719 A | 11/1998 | Gibson et al. |
| 5,948,062 A | 9/1999 | Tzelnic et al. |
| 6,105,100 A | 8/2000 | Dean et al. |
| 6,212,585 B1 | 4/2001 | Chrabaszcz |
| 6,230,319 B1 * | 5/2001 | Britt, Jr. .............. G06F 3/04892 348/42 |
| 6,243,747 B1 | 6/2001 | Lewis et al. |

(Continued)

OTHER PUBLICATIONS

Whiteley, Matt. "Ease Linux Deployments With Cobbler." Sep. 23, 2008. p. 1. <http://www.enterprisenetworkingplanet.com/print/netsystem/article.php/373596/Ease-Linus-Deployments-With-Cobbler.htm> Retrieved Jan. 30, 2012.

(Continued)

Primary Examiner — Christopher Biagini
(74) Attorney, Agent, or Firm — Lowenstein Sandler LLP (57) ABSTRACT

A provisioning server can provide and interact with an eraser agent on target machines. The eraser agent can execute on one or more target machines to erase all the contents of storage on the target machines. In particular, the eraser agent can utilize secure algorithms to alter and obscure the information stored the storage devices of the target machines. The provisioning server can instruct the target machines to alter their power state (e.g. power cycle), if necessary, to provide and to initiate the eraser agent.

20 Claims, 4 Drawing Sheets

(56) References Cited

U.S. PATENT DOCUMENTS

| | | |
|---|---|---|
| 6,272,536 B1 | 8/2001 | van Hoff et al. |
| 6,282,652 B1 | 8/2001 | Scheifler |
| 6,381,742 B2 | 4/2002 | Forbes et al. |
| 6,385,766 B1 | 5/2002 | Doran, Jr. et al. |
| 6,415,289 B1 | 7/2002 | Williams et al. |
| 6,438,711 B2 | 8/2002 | Woodruff |
| 6,516,427 B1 | 2/2003 | Keyes et al. |
| 6,526,442 B1 | 2/2003 | Stupek, Jr. et al. |
| 6,550,021 B1 | 4/2003 | Dalphy et al. |
| 6,557,169 B1 | 4/2003 | Erpeldinger |
| 6,594,664 B1 | 7/2003 | Estrada et al. |
| 6,611,869 B1 | 8/2003 | Eschelbeck et al. |
| 6,615,365 B1 | 9/2003 | Jenevein et al. |
| 6,625,742 B1 | 9/2003 | Owhadi et al. |
| 6,678,888 B1 | 1/2004 | Sakanishi |
| 6,686,838 B1 | 2/2004 | Rezvani et al. |
| 6,691,225 B1 | 2/2004 | Suffin |
| 6,751,659 B1 | 6/2004 | Fenger et al. |
| 6,757,837 B1 | 6/2004 | Platt et al. |
| 6,769,022 B1 | 7/2004 | DeKoning et al. |
| 6,779,004 B1 | 8/2004 | Zintel |
| 6,845,464 B2 | 1/2005 | Gold |
| 6,865,737 B1 | 3/2005 | Lucas et al. |
| 6,934,881 B2 | 8/2005 | Gold et al. |
| 6,941,518 B2 | 9/2005 | French et al. |
| 6,947,939 B2 | 9/2005 | Fujibayashi et al. |
| 6,966,058 B2 | 11/2005 | Earl et al. |
| 6,981,252 B1 | 12/2005 | Sadowsky |
| 6,986,033 B2 | 1/2006 | Miyamoto et al. |
| 7,003,560 B1 | 2/2006 | Mullen et al. |
| 7,013,461 B2 | 3/2006 | Hellerstein et al. |
| 7,036,010 B2 | 4/2006 | Wray |
| 7,051,101 B1 | 5/2006 | Dubrovsky et al. |
| 7,054,618 B1 | 5/2006 | McCullough |
| 7,058,797 B2 | 6/2006 | Miyamoto et al. |
| 7,062,676 B2 | 6/2006 | Shinohara et al. |
| 7,082,464 B2 | 7/2006 | Hasan et al. |
| 7,107,330 B1 | 9/2006 | Hamilton, II et al. |
| 7,127,742 B2 | 10/2006 | Kramer et al. |
| 7,133,822 B1 | 11/2006 | Jacobson |
| 7,134,122 B1 * | 11/2006 | Sero .......................... G06F 8/61 717/177 |
| 7,152,109 B2 | 12/2006 | Suorsa et al. |
| 7,165,109 B2 | 1/2007 | Chiloyan et al. |
| 7,185,071 B2 | 2/2007 | Berg et al. |
| 7,197,608 B2 | 3/2007 | Mikuma et al. |
| 7,200,662 B2 | 4/2007 | Hasan et al. |
| 7,200,845 B2 | 4/2007 | Morrison et al. |
| 7,205,240 B2 | 4/2007 | Karim et al. |
| 7,207,039 B2 | 4/2007 | Komarla et al. |
| 7,213,065 B2 | 5/2007 | Watt |
| 7,284,042 B2 | 10/2007 | Beadles et al. |
| 7,305,550 B2 | 12/2007 | Oliver et al. |
| 7,310,669 B2 | 12/2007 | Webb et al. |
| 7,315,826 B1 | 1/2008 | Guheen et al. |
| 7,330,967 B1 | 2/2008 | Pujare et al. |
| 7,340,637 B2 | 3/2008 | Nagoya |
| 7,346,801 B2 | 3/2008 | Brunelle et al. |
| 7,349,118 B2 | 3/2008 | Zipprich et al. |
| 7,350,112 B2 | 3/2008 | Fox et al. |
| 7,356,679 B1 | 4/2008 | Le et al. |
| 7,383,433 B2 | 6/2008 | Yeager et al. |
| 7,395,322 B2 | 7/2008 | Harvey et al. |
| 7,434,253 B2 | 10/2008 | Crall et al. |
| 7,448,033 B1 | 11/2008 | Kruger et al. |
| 7,480,907 B1 | 1/2009 | Marolia et al. |
| 7,506,040 B1 | 3/2009 | Rabe et al. |
| 7,506,151 B2 | 3/2009 | Miyamoto et al. |
| 7,509,487 B2 | 3/2009 | Lu et al. |
| 7,516,218 B2 | 4/2009 | Besson |
| 7,519,691 B2 | 4/2009 | Nichols et al. |
| 7,574,481 B2 | 8/2009 | Moore et al. |
| 7,596,227 B2 | 9/2009 | Illowsky et al. |
| 7,600,005 B2 | 10/2009 | Jamkhedkar et al. |
| 7,600,113 B2 | 10/2009 | Kuehnel et al. |
| 7,605,868 B2 | 10/2009 | Kondo et al. |
| 7,606,868 B1 | 10/2009 | Le et al. |
| 7,610,477 B2 | 10/2009 | Holladay et al. |
| 7,627,617 B2 | 12/2009 | Kavuri et al. |
| 7,640,325 B1 | 12/2009 | DeKoning et al. |
| 7,653,008 B2 | 1/2010 | Patrick et al. |
| 7,668,947 B2 | 2/2010 | Hutchinson et al. |
| 7,671,735 B2 | 3/2010 | Karaoguz et al. |
| 7,673,130 B2 | 3/2010 | Miyamoto et al. |
| 7,681,080 B2 | 3/2010 | Abali et al. |
| 7,689,664 B2 | 3/2010 | Karlberg |
| 7,716,316 B2 | 5/2010 | Nichols et al. |
| 7,734,717 B2 | 6/2010 | Saarimaki et al. |
| 7,779,119 B2 | 8/2010 | Ginter et al. |
| 7,787,863 B2 | 8/2010 | van de Groenendaal |
| 7,792,986 B2 | 9/2010 | Donoho et al. |
| 7,827,261 B1 | 11/2010 | Griswold, Jr. et al. |
| 7,827,590 B2 | 11/2010 | Hopen et al. |
| 7,831,692 B2 | 11/2010 | French et al. |
| 7,831,997 B2 | 11/2010 | Eldar et al. |
| 7,873,684 B2 | 1/2011 | Souder et al. |
| 7,937,437 B2 | 5/2011 | Fujii |
| 7,971,047 B1 | 6/2011 | Vlaovic et al. |
| 7,990,994 B1 | 8/2011 | Yeh et al. |
| 8,006,241 B2 | 8/2011 | Dias |
| 8,028,048 B2 | 9/2011 | Karve et al. |
| 8,051,181 B2 | 11/2011 | Larson et al. |
| 8,060,874 B2 | 11/2011 | Rengarajan et al. |
| 8,069,341 B2 | 11/2011 | Fries et al. |
| 8,073,908 B2 | 12/2011 | Heins et al. |
| 8,078,728 B1 | 12/2011 | Pollan et al. |
| 8,103,776 B2 | 1/2012 | DeHaan |
| 8,103,783 B2 | 1/2012 | Plamondon |
| 8,117,314 B2 | 2/2012 | Croft et al. |
| 8,117,600 B1 | 2/2012 | Roeck et al. |
| 8,131,825 B2 | 3/2012 | Nord et al. |
| 8,131,851 B2 | 3/2012 | Harlow |
| 8,132,166 B2 | 3/2012 | DeHaan |
| 8,135,989 B2 | 3/2012 | DeHaan et al. |
| 8,185,891 B2 | 5/2012 | DeHaan |
| 8,205,240 B2 | 6/2012 | Ansari et al. |
| 8,244,836 B2 | 8/2012 | DeHaan |
| 8,271,975 B2 | 9/2012 | DeHaan |
| 8,326,972 B2 | 12/2012 | DeHaan et al. |
| 8,336,089 B1 | 12/2012 | Ahmed et al. |
| 8,346,929 B1 | 1/2013 | Lai |
| 8,355,407 B2 | 1/2013 | Wookey et al. |
| 8,370,528 B2 | 2/2013 | Bryers et al. |
| 8,402,123 B2 | 3/2013 | DeHaan et al. |
| 8,407,687 B2 | 3/2013 | Moshir et al. |
| 8,413,259 B2 | 4/2013 | DeHaan et al. |
| 8,417,926 B2 | 4/2013 | DeHaan |
| 8,429,630 B2 | 4/2013 | Nickolov et al. |
| 8,498,941 B2 | 7/2013 | Felsher |
| 8,504,696 B2 | 8/2013 | Larson et al. |
| 8,527,578 B2 | 9/2013 | DeHaan |
| 8,527,613 B2 | 9/2013 | Malone et al. |
| 8,572,587 B2 | 10/2013 | DeHaan et al. |
| 8,612,968 B2 | 12/2013 | DeHaan et al. |
| 8,640,122 B2 | 1/2014 | DeHaan |
| 8,667,096 B2 | 3/2014 | DeHaan et al. |
| 8,694,763 B2 | 4/2014 | Thorsen |
| 8,713,177 B2 | 4/2014 | DeHaan et al. |
| 8,713,295 B2 | 4/2014 | Bax et al. |
| 8,775,578 B2 | 7/2014 | DeHaan et al. |
| 8,782,204 B2 | 7/2014 | DeHaan et al. |
| 8,793,683 B2 | 7/2014 | DeHaan |
| 8,825,819 B2 | 9/2014 | Henson |
| 8,832,256 B2 | 9/2014 | DeHaan et al. |
| 8,838,827 B2 | 9/2014 | DeHaan |
| 8,892,700 B2 | 11/2014 | DeHaan et al. |
| 8,898,305 B2 | 11/2014 | DeHaan |
| 8,930,512 B2 | 1/2015 | DeHaan |
| 8,990,368 B2 | 3/2015 | DeHaan et al. |
| 9,021,470 B2 | 4/2015 | DeHaan |
| 9,047,155 B2 | 6/2015 | DeHaan |
| 9,100,297 B2 | 8/2015 | DeHaan |
| 9,111,118 B2 | 8/2015 | DeHaan |
| 9,124,497 B2 | 9/2015 | DeHaan et al. |

(56) References Cited

U.S. PATENT DOCUMENTS

| | | |
|---|---|---|
| 9,134,987 B2 | 9/2015 | DeHaan |
| 9,280,337 B2 | 3/2016 | Palaniappan |
| 2001/0037474 A1 | 11/2001 | Steegmans |
| 2002/0053047 A1 | 5/2002 | Gold |
| 2002/0062259 A1 | 5/2002 | Katz et al. |
| 2002/0078186 A1 | 6/2002 | Engel et al. |
| 2002/0099787 A1 | 7/2002 | Bonner et al. |
| 2002/0138567 A1 | 9/2002 | Ogawa |
| 2002/0138578 A1 | 9/2002 | Zhou |
| 2002/0156874 A1 | 10/2002 | Suorsa et al. |
| 2002/0162028 A1 | 10/2002 | Kennedy |
| 2002/0184484 A1 | 12/2002 | Abboud et al. |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammed |
| 2003/0126585 A1 | 7/2003 | Parry |
| 2003/0145083 A1 | 7/2003 | Cush et al. |
| 2003/0195921 A1 | 10/2003 | Becker et al. |
| 2003/0212992 A1 | 11/2003 | Ronning et al. |
| 2003/0233648 A1 | 12/2003 | Earl et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0088367 A1 | 5/2004 | Reinke |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2004/0226010 A1 | 11/2004 | Suorsa |
| 2004/0268340 A1* | 12/2004 | Steeb .................. G06F 8/60 717/174 |
| 2005/0028025 A1 | 2/2005 | Zalewski et al. |
| 2005/0050175 A1 | 3/2005 | Fong et al. |
| 2005/0055350 A1 | 3/2005 | Werme et al. |
| 2005/0102562 A1 | 5/2005 | Shinohara et al. |
| 2005/0108369 A1 | 5/2005 | Sather et al. |
| 2005/0114474 A1 | 5/2005 | Anderson et al. |
| 2005/0125525 A1 | 6/2005 | Zhou et al. |
| 2005/0138164 A1 | 6/2005 | Burton et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0216911 A1 | 9/2005 | Yen et al. |
| 2005/0223374 A1 | 10/2005 | Wishart et al. |
| 2005/0257041 A1* | 11/2005 | Wallenstein ............. G06F 1/24 713/2 |
| 2006/0004917 A1 | 1/2006 | Wang et al. |
| 2006/0039340 A1 | 2/2006 | Ptasinski et al. |
| 2006/0041767 A1 | 2/2006 | Maxwell et al. |
| 2006/0080656 A1 | 4/2006 | Cain et al. |
| 2006/0080659 A1 | 4/2006 | Ganji |
| 2006/0085625 A1* | 4/2006 | Cheston .................. G06F 8/63 713/1 |
| 2006/0095230 A1 | 5/2006 | Grier et al. |
| 2006/0095702 A1 | 5/2006 | Hickman et al. |
| 2006/0143432 A1 | 6/2006 | Rothman et al. |
| 2006/0155857 A1 | 7/2006 | Feenan, Jr. et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0058657 A1 | 3/2007 | Holt et al. |
| 2007/0067419 A1 | 3/2007 | Bennett |
| 2007/0078988 A1 | 4/2007 | Miloushev et al. |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0234337 A1 | 10/2007 | Suzuki et al. |
| 2007/0239858 A1 | 10/2007 | Banerji et al. |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294369 A1 | 12/2007 | Ginter et al. |
| 2007/0294376 A1 | 12/2007 | Ayachitula et al. |
| 2007/0299951 A1 | 12/2007 | Krithivas |
| 2008/0002588 A1 | 1/2008 | McCaughan et al. |
| 2008/0010639 A1* | 1/2008 | Bestmann .................. G06F 8/63 718/100 |
| 2008/0016515 A1 | 1/2008 | Naim et al. |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0170510 A1 | 7/2008 | Singh |
| 2008/0189693 A1 | 8/2008 | Pathak |
| 2008/0196043 A1 | 8/2008 | Feinleib et al. |
| 2008/0209033 A1 | 8/2008 | Ginter et al. |
| 2008/0215668 A1 | 9/2008 | Hu |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0263543 A1 | 10/2008 | Ramachandran |
| 2008/0270674 A1 | 10/2008 | Ginzton |
| 2008/0288506 A1 | 11/2008 | Brown |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0298274 A1 | 12/2008 | Takashige et al. |
| 2008/0301666 A1 | 12/2008 | Gordon et al. |
| 2008/0301780 A1 | 12/2008 | Ellison et al. |
| 2008/0313716 A1 | 12/2008 | Park |
| 2008/0320110 A1 | 12/2008 | Pathak |
| 2008/0320466 A1 | 12/2008 | Dias |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland, IV et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0228629 A1 | 9/2009 | Gebhart et al. |
| 2009/0235349 A1 | 9/2009 | Lai et al. |
| 2009/0240835 A1 | 9/2009 | Adelman et al. |
| 2009/0249296 A1 | 10/2009 | Haenel et al. |
| 2009/0249336 A1 | 10/2009 | Vasilevsky et al. |
| 2009/0249473 A1 | 10/2009 | Cohn |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2009/0300180 A1 | 12/2009 | DeHaan et al. |
| 2010/0023740 A1 | 1/2010 | Moon et al. |
| 2010/0049838 A1 | 2/2010 | DeHaan |
| 2010/0050169 A1 | 2/2010 | DeHaan |

(56) References Cited

U.S. PATENT DOCUMENTS

| | | |
|---|---|---|
| 2010/0054156 A1 | 3/2010 | DeHaan |
| 2010/0057833 A1 | 3/2010 | DeHaan |
| 2010/0057890 A1 | 3/2010 | DeHaan |
| 2010/0057913 A1 | 3/2010 | DeHaan |
| 2010/0057930 A1 | 3/2010 | DeHaan |
| 2010/0058307 A1 | 3/2010 | DeHaan |
| 2010/0058327 A1 | 3/2010 | Dehaan |
| 2010/0058328 A1 | 3/2010 | DeHaan |
| 2010/0058330 A1 | 3/2010 | DeHaan |
| 2010/0058332 A1 | 3/2010 | DeHaan |
| 2010/0058444 A1 | 3/2010 | DeHaan |
| 2010/0082799 A1 | 4/2010 | DeHaan et al. |
| 2010/0083245 A1 | 4/2010 | DeHaan et al. |
| 2010/0100876 A1 | 4/2010 | Glover et al. |
| 2010/0128639 A1 | 5/2010 | DeHaan et al. |
| 2010/0131648 A1 | 5/2010 | DeHaan |
| 2010/0138521 A1 | 6/2010 | DeHaan et al. |
| 2010/0138696 A1 | 6/2010 | DeHaan et al. |
| 2010/0217837 A1 | 8/2010 | Ansari et al. |
| 2010/0217840 A1 | 8/2010 | Dehaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan |
| 2010/0223504 A1 | 9/2010 | DeHaan et al. |
| 2010/0223607 A1 | 9/2010 | DeHaan |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |
| 2010/0235433 A1 | 9/2010 | Ansari et al. |
| 2010/0250907 A1 | 9/2010 | DeHaan |
| 2010/0287363 A1 | 11/2010 | Thorsen |
| 2010/0306337 A1 | 12/2010 | DeHaan |
| 2010/0306380 A1 | 12/2010 | DeHaan |
| 2010/0333084 A1 | 12/2010 | DeHaan |
| 2011/0061045 A1 | 3/2011 | Phillips |
| 2011/0131304 A1 | 6/2011 | Henson |
| 2011/0131384 A1 | 6/2011 | Henson |
| 2012/0151470 A1 | 6/2012 | DeHaan |
| 2012/0185559 A1 | 7/2012 | Wesley, Sr. et al. |
| 2013/0117766 A1 | 5/2013 | Bax et al. |

OTHER PUBLICATIONS

HP Storage Essentials SRM 6.0 Installation Guide. Jan. 2008. HP. 1st ed. Part No. T4283-96113. pp. 1-5, 97-136, 219-228.

HP Storage Essentials SRM 6.0 User Guide. Jan. 2008. HP. 1st ed. Part No. T4238-96114. pp. 1-83.

DeHaan, M., "Unified Provisioning", Red Hat Emerging Technologies Group, 2007, 29 pages.

DeHaan, M., "Provisioning With Cobbler", Red Hat San Diego Summit, 2007, 28 pages.

Tan et al., "A WBEM Basked Disk Array Management Provider", 2005, IEEE, 2005 International Conference on Cyberworlds, 5 pages.

Lovelace et al., "Managing Disk Subsystems using IBM TotalStorage Productivity Center" Sep. 2005. IBM. 2nd ed. SG24-7097-01. pp. 1-42.

Doc Searls "Linux for Suits", 2005, Specialized System Consultants Inc., vol. 2005, pp. 1-5, http://delivery.acm.org/10.1145/1070000/1064902/8180.html?key1=1064902&key2=8191535821&coll=AC . . . retrieved Sep. 24, 2010.

eBook "Microsoft System Management Server 2003 Administrator's Companion", Microsoft Press, c2004, Ch. 13, Patch Management, pp. 471-507.

Butt et al., "Automated Installation of Large-Scale Linux Networks", 2000, pp. 1-7, http://delivery.acm.org/10.1145/370000/364420/a8-butt.html?key1=364420&key2=7312474821&coll=GUID . . . retrieved Sep. 17, 2010.

Agarwalla, et al. "Automating Provisioning of Complete Software Stack in a Grid Environment", 2004, 18 pages.

Anderson et al., "Technologies for Large-Scale Configuration Management", Grid Weaver, Rev. 1.0, Dec. 9, 2002, pp. 1-61.

Grosse, "Repository Mirroring", ACM Transactions on Mathematical Software, vol. 21, No. 1, Mar. 1995, pp. 89-97.

Judit, N, "Automatic Installation and Configuration for Large Scale Farms", CERN-THESIS, Dec. 6, 2005, ELTE Faculty of Informatics 2005, Budapest, 89 pages.

Quintero et al., "Introduction to pSeries Provisioning", IBM/Redbooks, Nov. 2004, 216 pages.

Maghraoui et al., "Model Driven Provisioning: Bridging the Gap Between Declarative Object Models and Procedural Provisioning Tools", LNCS 4290, 2006, International Federation for Information Processing 2006, pp. 404-423.

* cited by examiner

RETIRING TARGET MACHINES BY A PROVISIONING SERVER

RELATED APPLICATION

This application claims the benefit of U.S. application Ser. No. 12/475,427, filed on May 29, 2009, the content of which is hereby incorporated by reference herein.

FIELD

This invention relates generally to software provisioning.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

In software provisioning, the administrator may desire to remove a target machine from the network. For example, the target machine may be scheduled to be replaced or may be malfunctioning. As such, in order to remove the machine, the administrator must remove all information from the target machine to prevent sensitive information from being accessed after the target machine physically leaves the network. Typically, the administrator must physically visit the target machine to erase the information.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for retiring target machines in a software provisioning environment. More particularly, a provisioning server can utilize an eraser agent on target machines to securely and reliably remove all information from target machines.

According to embodiments, a provisioning server can be configured to provide and to interact with an eraser agent on target machines. The eraser agent can be configured to execute on one or more target machines to erase all the contents of storage on the target machines. In particular, the eraser agent can be configured to utilize secure algorithms to alter and obscure the information stored the storage devices of the target machines.

According to embodiments, to provide the eraser agent, the provisioning server can be configured to instruct a network management server to provide a command to a helper client on the target machines. The command can be configured to cause the helper client to retrieve the eraser agent from the provisioning server. Additionally, the provisioning server can be configured to instruct the helper client, directly. Likewise, the provisioning server can be configured to transmit the eraser agent to the target machines and to instruct the target machines to alter their power state (e.g. power cycle), if necessary, to provide and to initiate the eraser agent.

By utilizing the eraser agent, the provisioning server can automate the retirement of target machines in the software provisioning environment. Additionally, because the eraser agent securely erases all the information, the provisioning server can reliably prevent the unwanted access and loss of sensitive information.

Figure 1:
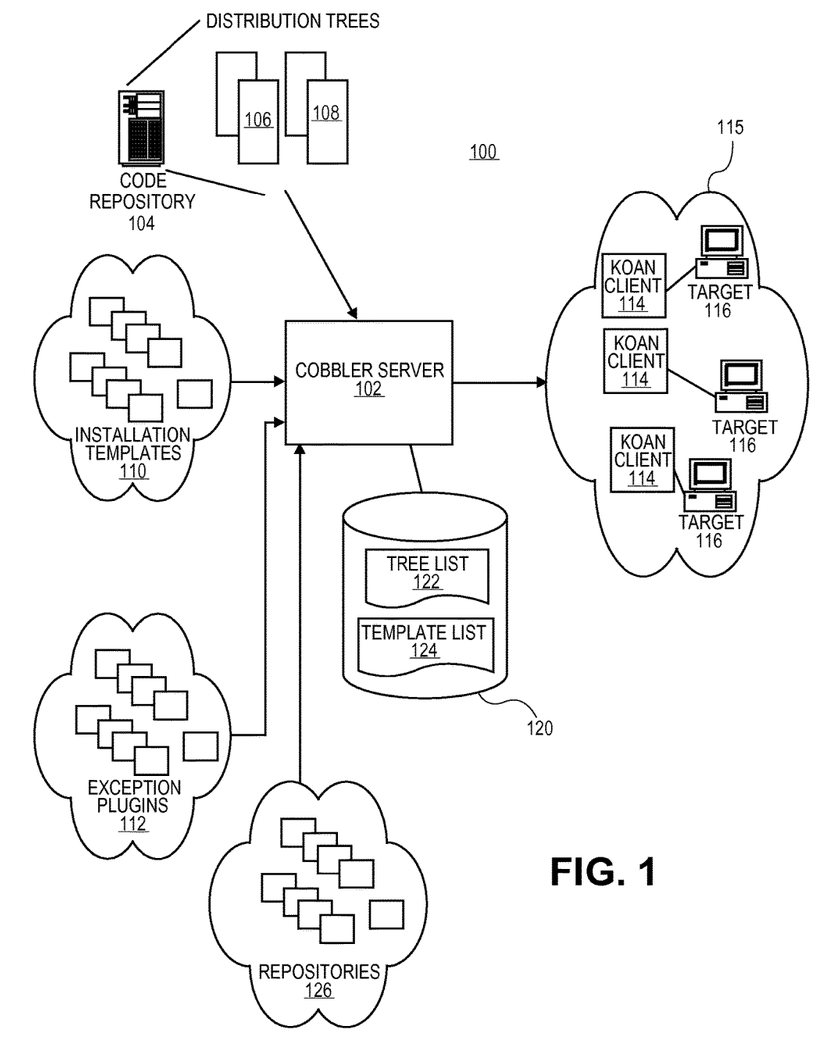
FIG. 1 illustrates an overall provisioning environment in which various embodiments of the present teachings can be practiced.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present teachings may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as an extensible markup language remote procedure call (XMLRPC) handler; linking to or mirroring install distribution trees and a configuration database; hosting kickstart templates; hosting plugins; generating installation images, and the like. The cobbler server 102 can be implemented as software, such as Python code, installed on a boot server machine and provide a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 can be implemented using well known components of hardware and software. Additionally, the code repository 104 can include one or more repositories hosting distributions. The distributions 106 and 108 can include bundles of software that are already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 are software that interact with cobbler server 102 to customize the provisioning of software. In general, the exception plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with --virt or --replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 can represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. System commands associate a hostname, IP, or (machine access control) MAC with a distribution and optionally customize the profile further. Repositories contain update information, such as yum mirror information that the cobbler server 102 uses to mirror repository 104. The cobbler server 102 can also manage (generate) dynamic host configuration protocol (DHCP) configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amount of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [--arg1=] [--arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008-0288938 (issued as U.S. Pat. No. 8,185,891) and U.S. patent application Ser. No. 11/763,333, U.S. Patent Publication No. 2008-0288939 (issued as U.S. Pat. No. 8,132,166), all assigned to Red Hat, Inc., the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing an rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. System commands can assign a piece of hardware with cobbler server 102 to a profile. Systems can be defined by hostname, Internet Protocol (IP) address, or machine access control (MAC) address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default, systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users can use this command to replace a server that is being repurposed, or when no PXE environment can be created. Thus, the enchant option allows the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, when fast installation and upgrades for systems are desired, or software not in a standard repository exists and provisioned systems desire to know about that repository.

According to exemplary aspects, the cobbler server 102 can also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance with orders from the cobbler server 102. Once finished, an administrator can use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configure DHCP and DNS configuration information.

According to exemplary aspects, the cobbler server 102 can serve the request of the koan client 114. The koan client 114 can acknowledge the service of information of the cobbler server 102 and can then initiate installation of the software being provisioned. Additionally, the koan client 114 can either install the requested software, e.g., replace the existing operating system, or install a virtual machine.

Figure 2:
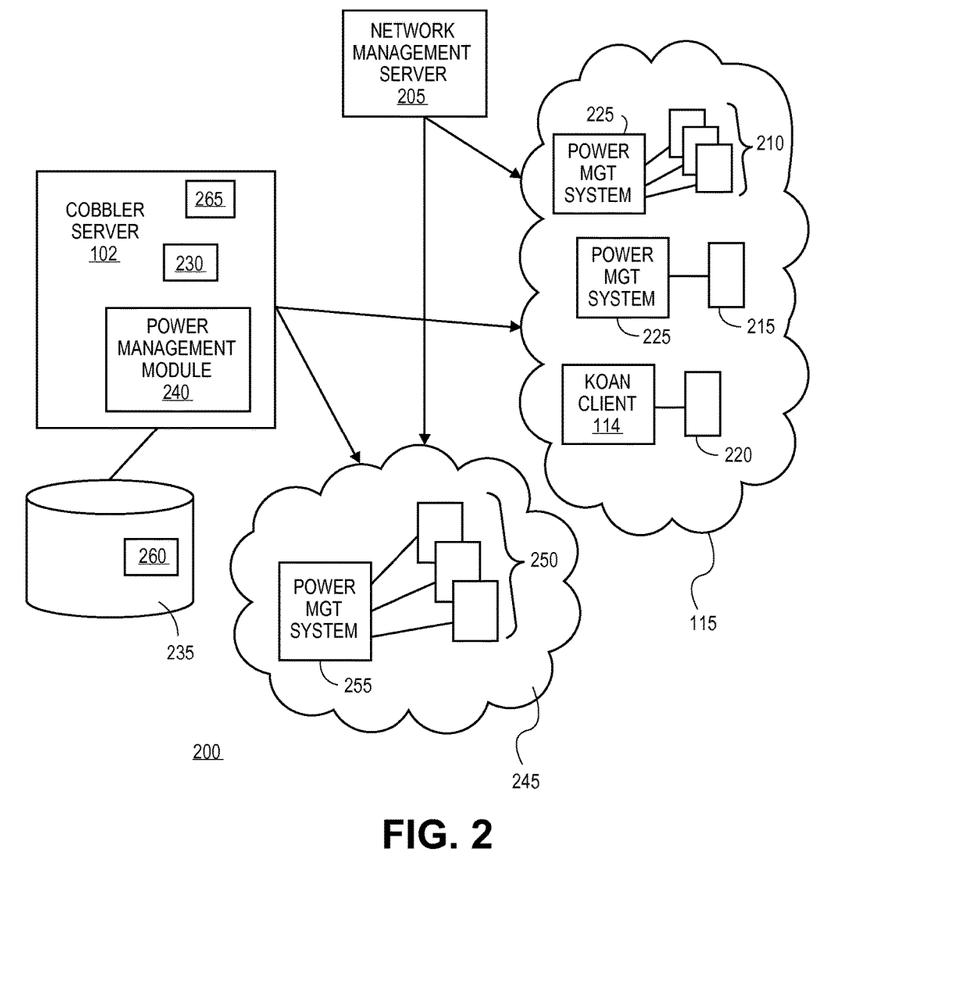
FIG. 2 illustrates the overall provisioning environment in which a provisioning server can retire target machines or networks, according to various embodiments.

FIG. 2 illustrates aspects of the provisioning environment 200 that allows for retiring of target machines by the cobbler server 102. In embodiments as shown, the cobbler server 102 can be coupled to a network 115 and a network management server 205 to provide provisioning processes and other actions related to provisioning for the network 115. While FIG. 2 illustrates one network 115 with exemplary components, one skilled in the art will realize that the cobbler server 102 can be coupled to multiple networks to provide provisioning processes and other actions related to provisioning.

As shown in FIG. 2, the network 115 can include a number of target machines 210, 215, and 220. For example, the target machines 210 can include a set of target machines such as a group of server computers, such as blade servers. The target machines 215 and 220 can include computing systems such as servers, personal computers, laptop computers, etc. Any of the target machines 210, 215, and 220, for example the target machines 210 and 215, can be connected to power management systems 225 to control the power supplied to the target machines 210, 215, and 220 and to alter the power state of one or more of the target machines 210, 215, and 220 (e.g. power cycle). The power management systems 225 can be any types of systems to manage the power of the target machines, for example, Integrated Lights Out (ILO) by Hewlett Packard™ Corporation, Dell™ Remote Access Control (DRAC) by Dell Corporation, WTI powerbar by Western Telematics, Inc, and other power system supporting network communications. Additionally, each of the target machines 210, 215, and 220, for example the target machine 220, can be configured to include the koan client 114.

In embodiments, the target machines 210, 215, and 220 can include hardware typically found in conventional computing systems (processors, memory, video cards, network interface cards, storage devices, and the like). Additionally, each of the target machines 210, 215, and 220 can be installed with different types of software (OS, application programs, and the like) to perform different functions. For example, the target machine 215 can include software that cause the target machines 215 to operate as a server computing system to provide services (application server, database server, etc) to other computing systems, and the target machine 220 can include software that causes the target machine 220 to operate as a user or client computer.

In embodiments, the cobbler server 102 can be configured to retire one or more of the target machines 210, 215, and 220 or the entire network 115. Retiring can be associated with removing one or more of the target machines 210, 215, and 220 from the network 115 or completely re-tasking one or more of the target machines 210, 215, and 220. For example, one or more of the target machines 210, 215, and 220 can be scheduled to be replaced (malfunctioning, aging, etc.) and can be removed from the network 115 or be replaced with new target machines. Likewise, the programs, applications, processes, virtual machines, etc. running one or more of the target machines 210, 215, and 220 can be scheduled to be completely removed from the one or more of the target machines 210, 215, and 220. For example, the programs, applications, processes, virtual machines, etc. running one or more of the target machines 210, 215, and 220 can be scheduled to moved to other target machines, discontinued, and the like.

In embodiment, retiring the one or more of the target machines 210, 215, and 220 requires securely erasing all the information stored on the one or more of the target machines 210, 215, and 220. This is required to prevent the loss of sensitive or private information. For example, if the one or more of the target machines 210, 215, and 220 are being removed, the one or more of the target machines 210, 215, and 220 can be recycled or disposed. As such, third parties can gain access to any information stored on the one or more of the target machines 210, 215, and 220. Likewise, if the one or more of the target machines 210, 215, and 220 are being re-tasked, any new programs, applications, processes, or virtual machines can access any information remaining on the one or more of the target machines 210, 215, and 220.

In embodiments, in order to retire one or more of the target machines 210, 215, and 220, the cobbler server 102 can be configured to securely erase all the information contained on the one or more of the target machines 210, 215, and 220. To achieve this, the cobbler server 102 can be configured to provide an eraser agent 230 to one or more of the target machines 210, 215, and 220 being retired. In particular, the eraser agent 230 can be configured to securely erase all the information stored on the computer readable storage media and devices associated with the one or more of the target machines 210, 215, and 220. To securely erase all the information, the eraser agent 230 can utilize secure algorithms, methods, and processes to alter and obscure the information stored the computer readable storage media devices associated with the one or more of the target machines 210, 215, and 220. For example, the eraser agent 230 can utilize algorithms such as the Gutmann method and the like.

In embodiments, the eraser agent 230 can be configured to include the necessary logic, routines, instruction, and commands to boot the one or more of the target machines 210, 215, and 220 and to erase all the information on the storage associated with the one or more of the target machines 210, 215, and 220. The eraser agent 230 can be, for example, a disk image, an ISO image, a software appliance (e.g. portions of an OS and applications), operating system image (OS kernel and/or initrd), or any other type of tailored software application capable of executing on the target machines 210, 215, and 220. Likewise, the eraser agent 230 can be a conventional secure data erasing program or application such as Darik's Boot and Nuke (DBAN) and the like.

In embodiments, the cobbler server 102 can be configured to maintain the eraser agent 230 for access and utilization in retiring one or more of the target machines 210, 215, and 220. For example, the cobbler server 102 can be configured maintain the eraser agent 230 in a computer readable storage medium, for example computer readable storage medium 235, whether local to the cobbler server 102 or remotely located.

In embodiments, to provide the eraser agent 230, the cobbler server 102 can be configured to utilize a variety of methods to provide the eraser agent 230 to one or more of the target machines 210, 215, and 220. For example, to provide the eraser agent 230, the cobbler server 102 can be configured to provide the eraser agent 230 utilizing the network management server 205 and the koan client 114. For example, the cobbler server 102 can be configured to instruct the network management server 205 to provide a command to the koan client 114 on the target machine 220. The command can be configured to cause the koan client 114 to retrieve the eraser agent 230 from the cobbler server 102 and initiate the eraser agent 230 on the target machines 220. Likewise, the cobbler server 102 can be configured to directly instruct the koan client 114 to retrieve the eraser agent 230 and to initiate the eraser agent 230.

In embodiments, the network management server 205 can be any type of network management application or tool to securely communicate with the target machines 210, 215, and 220, to monitor the state of the target machines 210, 215, and 220, to retrieve and request data from the target machines 210, 215, and 220, and to manage and direct the target machines 210, 215, and 220. For example, the network management server 205 can be a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. 2009/0300180 and issued as U.S. Pat. No. 8,713,177) assigned to Red Hat Corporation, the disclosure of which is incorporated herein, in its entirety, by reference.

In embodiments, the cobbler server 102 can be configured to provide the eraser agent 230 to one or more the target machines 210, 215, and 220, directly. For example, the cobbler server 102 can be configured to transmit the eraser agent 230 to the target machines 205 utilizing any type of network processes, for example, PXE.

In embodiments, in order to provide and/or to execute the eraser agent 230, the cobbler server 102 can be configured to instruct one or more the target machines 210, 215, and 220 to alter their power state (e.g. power cycle), if necessary. For example, in order to provide the eraser agent 230, one or more the target machines 210, 215, and 220 may need to be power cycled in order to initiate the network transfer of the eraser agent 230. Likewise, the cobbler server 102 can power cycle (power down/power up) one or more the target machines 210, 215, and 220 in order to initiate the eraser agent 230 or restart one or more the target machines 210, 215, and 220 after the eraser agent 230 has completed erasing all the information. The cobbler server 102 can be configured to communicate with the power management system 225 of one or more the target machines 210, 215, and 220, to alter the power state of one or more the target machines 210, 215, and 220. To achieve this, the cobbler server 102 can be configured to include a power management module 240.

In embodiments, the power management module 240 can be configured to communicate with the power management systems 225 of the target machines 210, 215, and 220. The power management module 240 can be configured to instruct the power management systems 225 to alter the power state of the target machines 210, 215, and 220. The power management module 240 can be configured to generate a command or instruction. The instruction can include access information for the power management systems 225 and the power state alteration to be performed.

In embodiments, the power management module 240 can be configured to form the instruction in a protocol utilized by the particular power management systems 225. For example, the cobbler server 102 can be configured to utilize conventional or proprietary protocols or tools such as IPMI, DRAC, ILO, fence agents and the like. The power management module 240 can be configured to utilize a pre-determined protocol or utilize several protocols in order to determine the appropriate protocol. Once generated, the cobbler server 102 can be configured to transmit the instruction to the determined power management systems 225.

In embodiments, the power management module 240 can be implemented as a portion of the code for the cobbler server 102. Likewise, the power management module 240 can be implemented as a separate software tool accessible by the cobbler server 102. Additionally, the power management module 240 can be implemented as a portion of the code for the network management server 205. The power management module 240 can be written in a variety of programming languages, such as JAVA, C++, Python code, and the like to accommodate a variety of operating systems, machine architectures, etc. Additionally, the power management module 240 can be configured to include the appropriate application programming interfaces (APIs) to communicate with and cooperate with other components of the cobbler server 102.

In embodiments, associated with retiring one or more of the target machines 210, 215, and 220, the cobbler server 102 can be configured to perform provisioning actions before providing the eraser agent 230. For example, if one or more of the target machines 210, 215, and 220 or the network 115 is being retired and the target machines are being replaced, recycled, or disposed, the programs, application, processes, virtual machines, etc. still need to be supported by the provisioning environment 200. As such, the cobbler server 102 can be configured to migrate the programs, application, processes, virtual machines, etc. of the one or more target machines 210, 215, 220 to another network 245 onto target machines 250, prior to providing the eraser agent 230.

In embodiment, associated with retiring one or more of the target machines 210, 215, and 220, the cobbler server 102 can be configured to perform provisioning actions after providing the eraser agent 230. For example, if new target machines are being added to the network 115, the cobbler server 102 can be configured to migrate the programs, application, processes, virtual machines, etc. back to the network 115. Likewise, the cobbler server 102 can be configured to install new programs, application, processes, virtual machines, etc. on one or more of the target machines 210, 215, and 220 if the target machines are being re-tasked.

In embodiments, to migrate the programs, application, processes, virtual machines, etc. or install new programs, application, processes, virtual machines, etc., the cobbler server 102 can be configured to re-provision the programs, application, processes, virtual machines, etc. using the provisioning objects, as described above in FIG. 1. As such, the cobbler server 102 can be configured to maintain an inventory 260 of the target machines 210, 215, and 220 in the network 115 and target machines 250 in the network 245. The inventory 260 can include information that describes the target machines such as hardware, software provisioned, provisioning objects associated with the target machine, configurations, the power managements systems 225 255, etc. associated with data that uniquely identifies the target machines 210, 215, 220 in the network 115 and the target machines 250 in the network 245 such as Media Access Control ("MAC") address, Ethernet Hardware Address ("EHA"), and the like.

In embodiments, the provisioning objects can include all the data required by the cobbler server 102 to perform the software provisioning processes, such as the process described above, supported by the cobbler server 102. For example, the provisioning objects can include software distributions; configuration templates (templates for generating configuration files, such as kickstart files); distribution profile information (mapping a distribution to profile; a configuration template or a configuration file, and additional preferences, such as kernel options, template variables, or virtual machine settings); target machine information (information representing the mapping of a physical piece of hardware, plus hardware specific customizations, to a profile that it should run); repos information (information representing external or internal software repositories stored on the cobbler server); images (such as distributions representing an undefined executable image (like "memtest"); a virtual machine to be cloned, or an ISO file for use in installing a virtual machine); and the like.

In embodiments, to migrate the programs, application, processes, virtual machines, etc. or install new programs, application, processes, virtual machines, etc., the cobbler server 102 can be configured to utilize a cloner agent 265 and the power management systems 255 of the new network 245. The cloner agent 265 can be configured to create any exact copy of the storage of one or more of the target machines 210, 215, and 220. For example, the cloner agent 265 can be the cloner agent as described in U.S. patent application Ser. No. 12/473,014, filed May 27, 2009, entitled "SYSTEMS AND METHODS FOR CLONING TARGET MACHINES IN A SOFTWARE PROVISIONING ENVIRONMENT" (U.S. Patent Application Publication No. 2010/0306337) assigned to Red Hat Corporation, the disclosure of which is incorporated herein, in its entirety, by reference.

Figure 3:
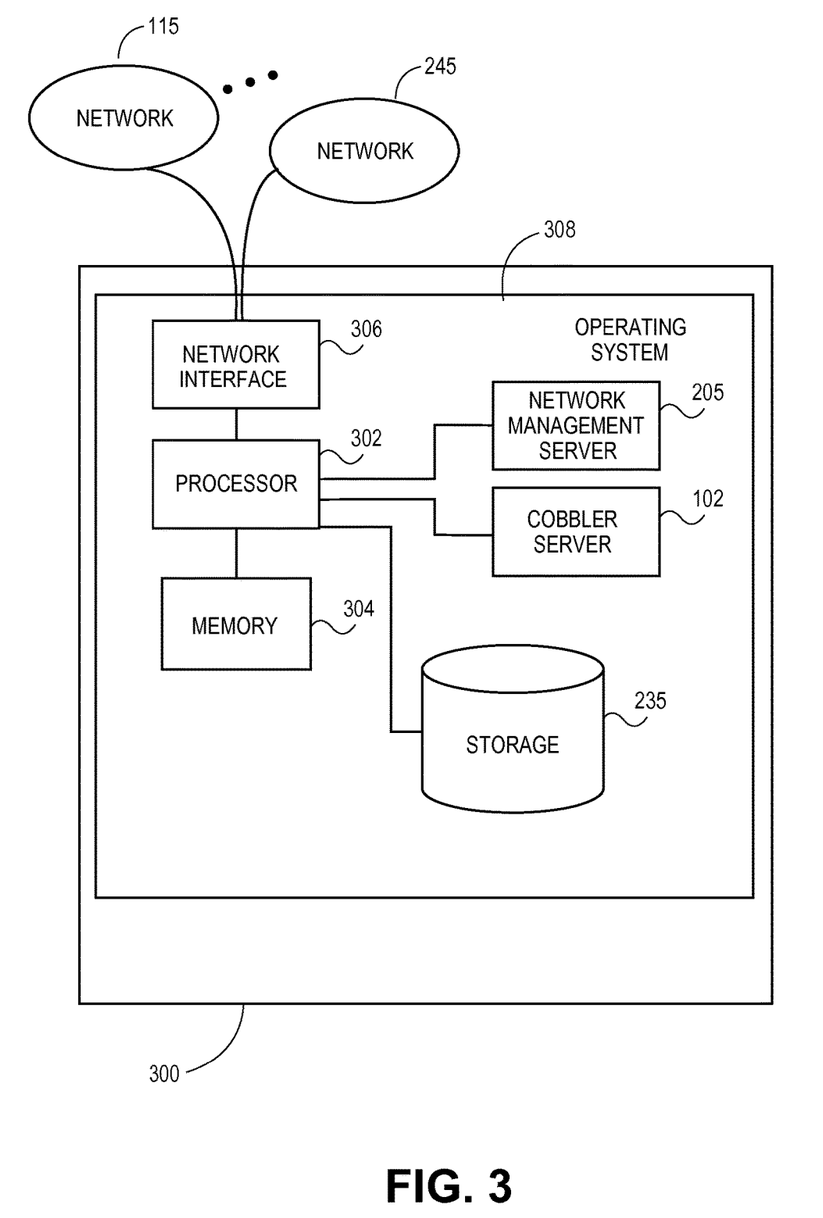
FIG. 3 illustrates an exemplary hardware configuration for a provisioning server, according to various embodiments.

FIG. 3 illustrates an exemplary diagram of hardware and other resources that can be incorporated in a computing system 300 configured to communicate with the network 115 and the network 245, and execute the cobbler server 102 and the network management server 205 according to embodiments. In embodiments as shown, the computing system 300 can comprise a processor 302 communicating with memory 304, such as electronic random access memory, operating under control of or in conjunction with operating system 308. Operating system 308 can be, for example, a distribution of the Linux™ operating system, the Unix™ operating system, or other open-source or proprietary operating system or platform. Processor 302 also communicates with the computer readable storage medium 235, such as hard drives, optical storage, and the like, whether local to or remote from the computing system 300. While illustrated as a local storage in computing system 300, the computer readable storage medium 235 can be separate from the computing system 300, and the cobbler server 102 can be configured to communicate with the remote computer readable storage medium 235.

Processor 302 further communicates with network interface 306, such as an Ethernet or wireless data connection, which in turn communicates with one or more networks 115 and 245, such as the Internet or other public or private networks. Processor 302 also communicates with the computer readable storage medium 235, the cobbler server 102, and the network management server 205, to execute control logic and perform the retiring processes described above and below.

As illustrated, the cobbler server 102 can be implemented as a software application or program capable of being executed by a conventional computer platform. Likewise, the cobbler server 102 can also be implemented as a software module or program module capable of being incorporated in other software applications and programs. In either case, the cobbler server 102 can be implemented in any type of conventional proprietary or open-source computer language. When implemented as a software application or program code, the cloud management system 102 can be stored in a computer readable storage medium, such as the computer readable storage medium 235, accessible by the computing system 300.

As illustrated, the network management server 205 can be executed in the computing system 300. Likewise, the network management server 205 can be executed in a separate computing system including components similar to computing system 300. Accordingly, the computing system 300 can communicate with the network management server 205 via the network interface 306.

Figure 4:
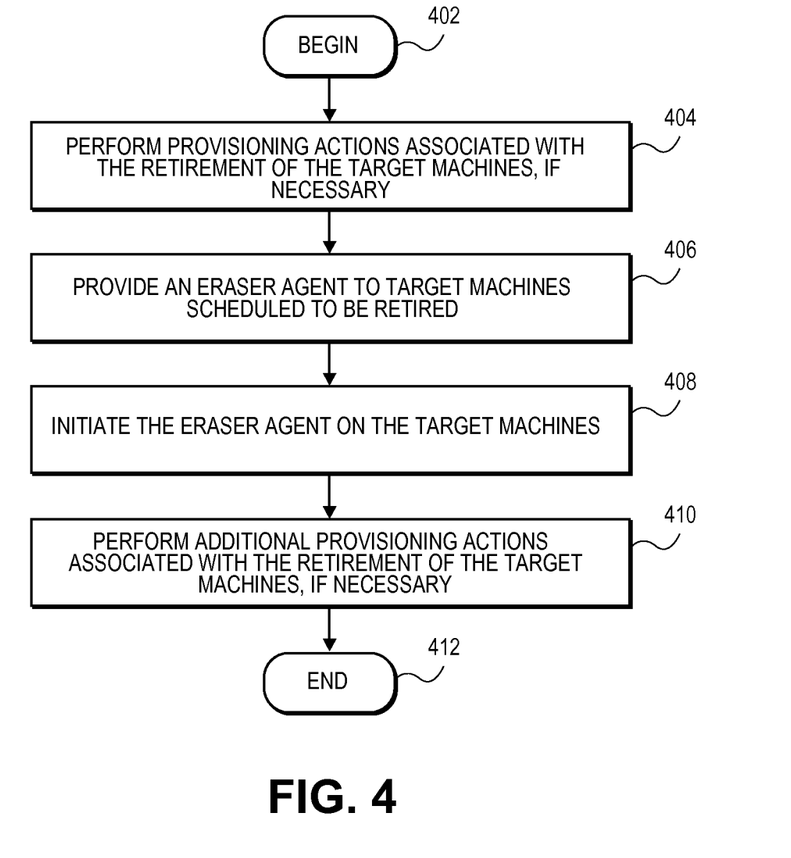
FIG. 4 illustrates a flowchart for an exemplary process of retiring target machines, according to various embodiments.

FIG. 4 illustrates a flow diagram for an exemplary process of retiring target machines in the provisioning environment 200, according to embodiments of the present teachings. In 402, the process can begin. In 404, the cobbler server 102 can perform provisioning actions associated with the retirement of the target machines, if necessary. For example, the cobbler server 102 can migrate programs, applications, processes, virtual machines, etc. to target machines 250 in the network 245.

In 406, the cobbler server 102 can provide the eraser agent 230 to target machines to be retired. For example, the cobbler server 102 can transfer the eraser agent 230 by a network protocol, such as PXE. Likewise, the cobbler server 102 can utilize the network management server 205 and/or a koan client to provide the eraser agent 230.

In 408, the cobbler server 102 can initiate the eraser agent 230 on the target machines to be retired. For example, the cobbler server 102 can instruct the power management system 225 to power cycle the target machines to initiate the eraser agent 230, if necessary. After initiation, the eraser agent 230 can erase all the information contained in the storage of the target machines, for instance, one or more of the target machines 210, 215, and 220.

In 410, the cobbler server 102 can perform additional provisioning actions associated with the retirement of the target machines, if necessary. For example, the cobbler server 102 can migrate the programs, processes, applications, virtual machines, etc. back to the network 115 or provision new programs, processes, applications, virtual machines, etc.

In 412, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method, comprising:
    identifying, by a processor, a target machine in a network for retirement;
    instructing, by the processor, the target machine over the network to power cycle to initiate a network transfer of an eraser agent to the target machine to securely erase information stored on a computer readable storage media device associated with the target machine, wherein the power cycle comprises powering down and powering up the target machine;
    subsequent to the power cycle by the target machine, initiating, by the processor, the network transfer of the eraser agent over the network the target machine, wherein the eraser agent is to securely erase the information stored on the computer readable storage media device associated with the target machine; and
    instructing, by the processor, the target machine over the network to power cycle to initiate an initial execution of the eraser agent, wherein the eraser agent is not executed on the target machine prior to the initial execution, wherein the eraser agent is transferred to the target machine prior to the power cycle to initiate the initial execution of the eraser agent, wherein responsive to initiating execution the eraser agent to securely erase the information.

2. The method of claim 1, the method further comprising copying the information stored on the target machine to another target machine prior to erasing the information.

3. The method of claim 1, the method further comprising provisioning software to the target machine utilizing at least one provisioning object, after erasing the information.

4. The method of claim 3, wherein the at least one provisioning object comprises at least one of a profile for provisioning the software, a template for provisioning the software, a software distribution record for provisioning the software, or a record for the target machine.

5. The method of claim 1, wherein the eraser agent utilizes a secure process to obscure or alter the information.

6. The method of claim 1, wherein instructing the target machine to power cycle comprises instructing a power management system to power down and power up the target machine.

7. The method of claim 1, wherein initiating the network transfer of the eraser agent comprises instructing a helper client of the target machine to retrieve the eraser agent.

8. A non-transitory computer readable storage medium including instructions that, responsive to being executed by a processor, cause the processor to:
    identify, by the processor, a target machine in a network for retirement;
    instruct, by the processor, the target machine over the network to power cycle to initiate a network transfer of an eraser agent to the target machine to securely erase information stored on a computer readable storage media device associated with the target machine, wherein the power cycle comprises powering down and powering up the target machine;
    subsequent to the power cycle by the target machine, initiate, by the processor, the network transfer of the eraser agent over the network to the target machine, wherein the eraser agent is to securely erase the information stored on the computer readable storage media device associated with the target machine; and
    instruct, by the processor, the target machine over the network to power cycle to initiate an initial execution of the eraser agent, wherein the eraser agent is not executed on the target machine prior to the initial execution, wherein the eraser agent is transferred to the target machine prior to the power cycle to initiate the initial execution of the eraser agent, wherein responsive to initiating execution the eraser agent to securely erase the information.

9. The non-transitory computer readable storage medium of claim 8, the processor further to copy the information stored on the target machine to another target machine prior to erasing the information.

10. The non-transitory computer readable storage medium of claim 8, the processor further to provision software to the target machine utilizing at least one provisioning object subsequent to erasing the information.

11. The non-transitory computer readable storage medium of claim 10, wherein the at least one provisioning object comprises at least one of a profile for provisioning the software, a template for provisioning the software, a software distribution record for provisioning the software, or a record for the target machine.

12. The non-transitory computer readable storage medium of claim 8, wherein the eraser agent utilizes a secure process to obscure or alter the information.

13. The non-transitory computer readable storage medium of claim 8, wherein to instruct the target machine to power cycle, the processor further to instruct a power management system to power down and power up the target machine.

14. The non-transitory computer readable storage medium of claim 8, wherein to initiate the network transfer of the eraser agent, the processor further to instruct a helper client of the target machine to retrieve the eraser agent.

15. A computing system comprising:
a memory; and
a processor, coupled to the memory, to:
identify a target machine in a network for retirement;
instruct the target machine over the network to power cycle to initiate a network transfer of an eraser agent to the target machine to securely erase information stored on a computer readable storage media device associated with the target machine, wherein the power cycle comprises powering down and powering up the target machine;
subsequent to the power cycle by the target machine, initiate the network transfer of the eraser agent over the network to the target machine, wherein the eraser agent is to securely erase the information stored on the computer readable storage media device associated with the target machine; and
instruct the target machine over the network to power cycle to initiate an initial execution of the eraser agent, wherein the eraser agent is not executed on the target machine prior to the initial execution, wherein the eraser agent is transferred to the target machine prior to the power cycle to initiate the initial execution of the eraser agent, wherein responsive to initiating execution the eraser agent to securely erase the information.

16. The computing system of claim 15, the processor further to copy the information stored on the target machine to another target machine prior to erasing the information.

17. The computing system of claim 15, the processor further to provision software to the target machine utilizing at least one provisioning object, after erasing the information.

18. The computing system of claim 15, wherein the eraser agent utilizes a secure process to obscure or alter the information.

19. The computing system of claim 15, wherein to instruct the target machine to power cycle, the processor further to instruct a power management system to power down and power up the target machine.

20. The computing system of claim 15, wherein to initiate the network transfer of the eraser agent, the processor further to instruct a helper client of the target machine to retrieve the eraser agent.

* * * * *